United States Patent [19]

Harvey-Rioux et al.

[11] Patent Number: 5,603,204

[45] Date of Patent: *Feb. 18, 1997

[54] AQUATIC PLANT HARVESTER

[76] Inventors: Conrad Harvey-Rioux, 154 Dearborn Avenue, London, Ontario, Canada, N6K 2W5; Douglas Lyke, P.O. Box 427, Wolseley, Saskatchewan, Canada, S0G 5H0

[ * ] Notice: The term of this patent shall not extend beyond the expiration date of Pat. No. 5,447,018.

[21] Appl. No.: 524,131

[22] Filed: Sep. 5, 1995

[51] Int. Cl.$^6$ .................................................. A01D 44/00
[52] U.S. Cl. ........................................ 56/9; 56/8; 37/343
[58] Field of Search ................... 56/8, 9, 514, 414.5; 37/343, 326, 329; 171/43; 172/122, 123, 125

[56] References Cited

U.S. PATENT DOCUMENTS

| | | |
|---|---|---|
| 4,248,033 | 2/1981 | Bryant . |
| 4,258,534 | 3/1981 | Bryant . |
| 4,638,621 | 1/1987 | Stewart, III et al. . |
| 4,885,902 | 12/1989 | Schmidt . |
| 5,069,023 | 12/1991 | Prochaska, Sr. et al. ............... 56/9 |
| 5,083,417 | 1/1992 | Jeronimidas et al. . |
| 5,161,354 | 11/1992 | Sygen et al. .......................... 56/8 |
| 5,201,168 | 4/1993 | Jenson . |
| 5,235,797 | 8/1993 | Sygen et al. . |
| 5,372,001 | 12/1994 | Olson et al. . |
| 5,404,696 | 4/1995 | Vasby ................................. 56/8 X |
| 5,447,018 | 9/1995 | Harvey-Rioux et al. ............ 56/8 X |
| 5,475,970 | 12/1995 | Landry, Jr. ........................... 56/8 |
| 5,481,856 | 1/1996 | Wickoren et al. .................. 56/8 X |

FOREIGN PATENT DOCUMENTS

2043630  3/1992  Canada .

Primary Examiner—Terry Lee Melius
Assistant Examiner—Robert Pezzuto
Attorney, Agent, or Firm—Murray E. Thrift; Adrian D. Battison

[57] ABSTRACT

Floating aquatic vegetation is harvest from the surface of a body of water. The vegetation is chopped or shredded when floating in situ on the body of water. The vegetation is then removed from the water surface. The chopping, shredding, tearing or other action breaks down the structure of the plants or subdivides them into smaller parts. This reduces the structure of the plant and allows it to be compacted to a much higher density mass so that it can be handled more readily. The apparatus for harvesting the vegetation includes a self-propelled vessel. A shredding head is carried on the vessel for shredding the vegetation as the platform advances thereacross and removing the shredded vegetation from the surface of the body of water. The vegetation shredding means are two rotors arranged in a shallow V arrangement across the front end of the vessel, with the point of the V directed forwardly, in the direction of travel. Rotors arranged in this way assist with the positive tracking of the platform. When rotated so that the bottom of the rotor travels towards the rear, and the top towards the front, the vegetation is directed towards the center of the vessel, behind the rotors, in a windrow for subsequent pickup. The V configuration also limits dispersion of the vegetation around the ends of the rotors. The rotors are covered on the top and ends by a shroud. This assists in preventing dispersal of the rent material and serves as part of the collecting system.

16 Claims, 9 Drawing Sheets

7
AQUATIC PLANT HARVESTER

FIELD OF THE INVENTION

The present invention relates to the harvesting of floating aquatic vegetation.

BACKGROUND

Floating aquatic vegetation is vegetation that grows on the surface of a body of water. Growths of aquatic vegetation, particularly Water Hyacinth can be a significant problem. This plant grows rapidly and can completely cover a body of water, making it useless for many purposes. There is consequently considerable incentive to remove such plants. In addition, it has now been found that some of this floating aquatic vegetation, again Water Hyacinth is an example, is useful for other purposes. It may, for example, be processed into animal fodder or fertilizer.

In consequence, various devices have been designed for removing floating aquatic vegetation from the surface of the water on which it is growing. One known device for this purpose simply chops the vegetation in the water where it is left to sink or disperse. Other systems include devices for gathering the vegetation on the water surface and for collecting the gathered vegetation in barges or delivering it to shore-based processors. These latter systems are preferred in that they actually remove the plants from the water rather than leaving dead vegetation to rot both on the bottom and on the shore.

With Water Hyacinth, problems arise because of the structure of the plant. It has a very open structure that can not readily be collapsed. When it is gathered and subsequently collected, it maintains this very open structure. This means that the handling equipment used must handle very large volumes of loose material. With floating collection systems, this requires either frequent trips to shore or a large number of collection barges. With land-based systems, the efficient delivery of the voluminous plants to the shore is equally inhibited.

The present invention is addressed to these and other problems with the harvesting of floating aquatic vegetation.

SUMMARY

According to one aspect of the present invention there is provided a method for harvesting floating aquatic vegetation at the surface of a body of water, said method comprising:

rending the vegetation when floating in situ on the body of water; and removing the rent vegetation from the surface of the body of water.

The term "rending" is intended to include any chopping, shredding, tearing or other action that breaks down the structure of the plants or subdivides them into smaller parts. Rending the vegetation into small parts at the surface reduces the structure of the plant and allows it to be compacted to a much higher density mass. This allows the gathering and collecting equipment to be designed according to the weight of the vegetation being handled rather than its volume.

According to another aspect of the present invention there is provided an apparatus for harvesting floating aquatic vegetation at the surface of a body of water, said apparatus comprising:

a platform floating on the body of water;

means for advancing the platform in a forwards direction across the body of water;

vegetation rending means, mounted on the platform and positioned at least partially in the body of water adjacent the surface thereof for rending the vegetation as the platform advances thereacross; and vegetation removing means mounted on the platform for removing the rent vegetation from the surface of the body of water.

The preferred vegetation rending means are two rotors arranged in a shallow V arrangement across the front end of the platform, with the point of the V directed forwardly, away from the platform. Rotors arranged in this way assist with the positive tracking of the platform. When rotated so that the bottom of the rotor travels towards the rear, and the top towards the front, the; rent vegetation is directed towards the center of the vessel, behind the rotors, in a windrow for subsequent pickup. The V configuration also limits dispersion of the vegetation around the ends of the rotors.

The rotors are preferably operated at the surface, although they can be submerged to whatever depth is desired. The rotors are usually operated within one meter of the water surface.

The rotors are preferably covered on the top and ends by a shroud. This assists in preventing dispersal of the rent material and serves as part of the collecting system.

The windrow of vegetation from the rotors is preferably collected by a conveyor elevating the windrow from the water and depositing it into a container. The windrow may be dewatered by passing it through the nip of a pair of counter-rotating dewatering rolls.

According to a further aspect of the present invention there is provided a harvesting head for mounting on a self-propelled, floating platform for harvesting floating aquatic vegetation from the surface of a body of water, said head comprising:

a boom;

boom mounting means for mounting the boom on the platform for pivoting movement about a substantially horizontal boom axis;

boom elevating means for controllably pivoting the boom about the boom axis;

a vegetation rending head comprising;
  two elongate rotors arranged end to end in an obtuse angle V-shape;
  vegetation chopping means mounted on each rotor; and
  means for rotating the rotors;

hanger means for pivotally mounting the vegetation rending head on the boom for movement about a head axis substantially parallel to the boom axis; and head pitch control means connected between the boom and the vegetation rending head for controllably pivoting the head about the head axis.

The head may be mounted on a vessel that will also accommodate other kinds of aquatic plant handling equipment, for example de-rooting and mowing heads.

BRIEF DESCRIPTION OF THE DRAWINGS

In the accompanying drawings, which illustrate an exemplary embodiment of the present invention.

DETAILED DESCRIPTION

Figure 1:
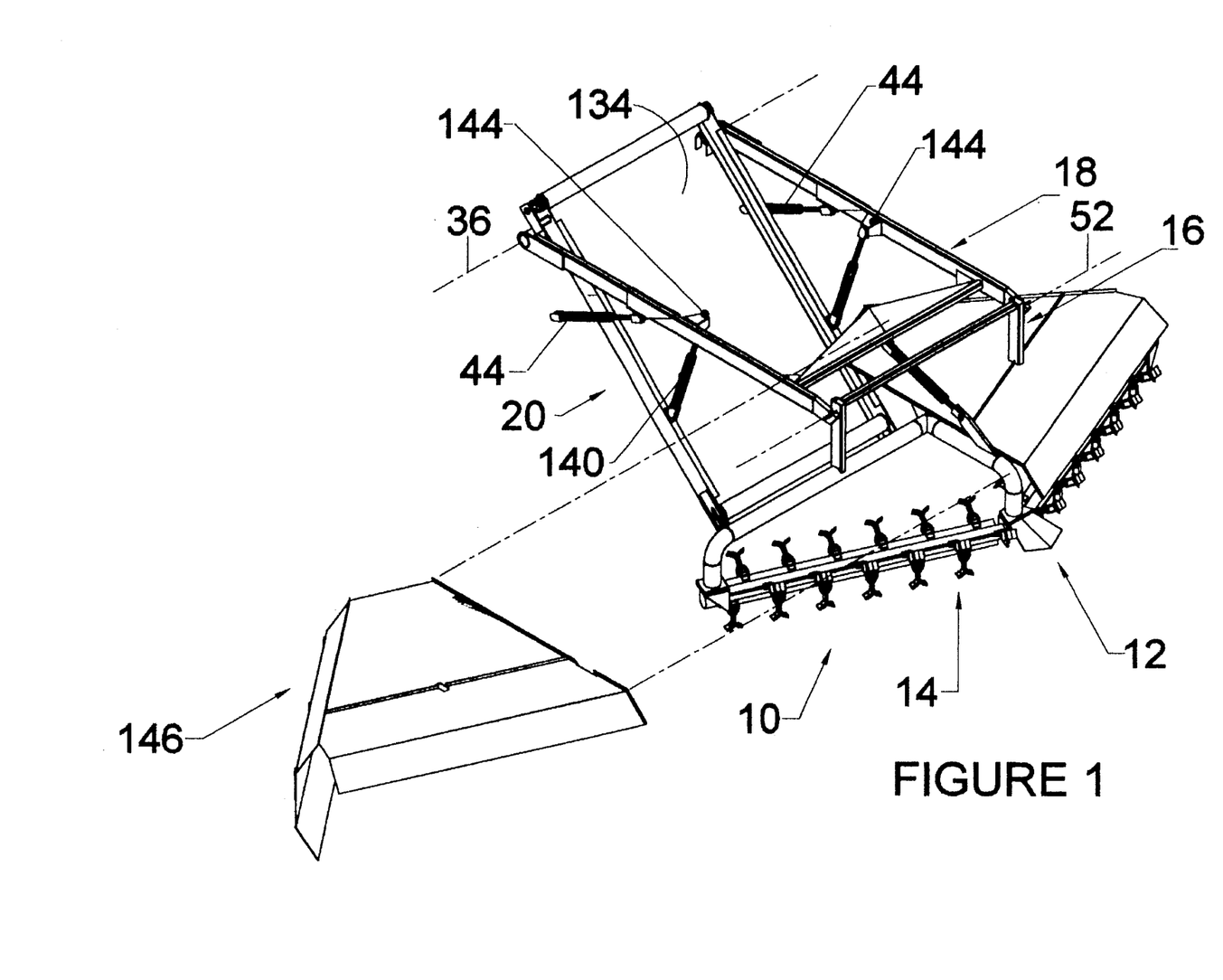
FIG. 1 is an isometric view of a shredding apparatus according to the present invention.

Referring to the accompanying drawings, and especially to FIG. 1, there is illustrated a shredding and harvesting apparatus 10. The apparatus includes a shredding head 12 for rending floating aquatic vegetation into smaller parts. This shredding head includes a rotor assembly 14 suspended by a hanger 16 from a boom 18. The head also includes a conveyor 20 positioned behind the shredding head.

Figure 2:
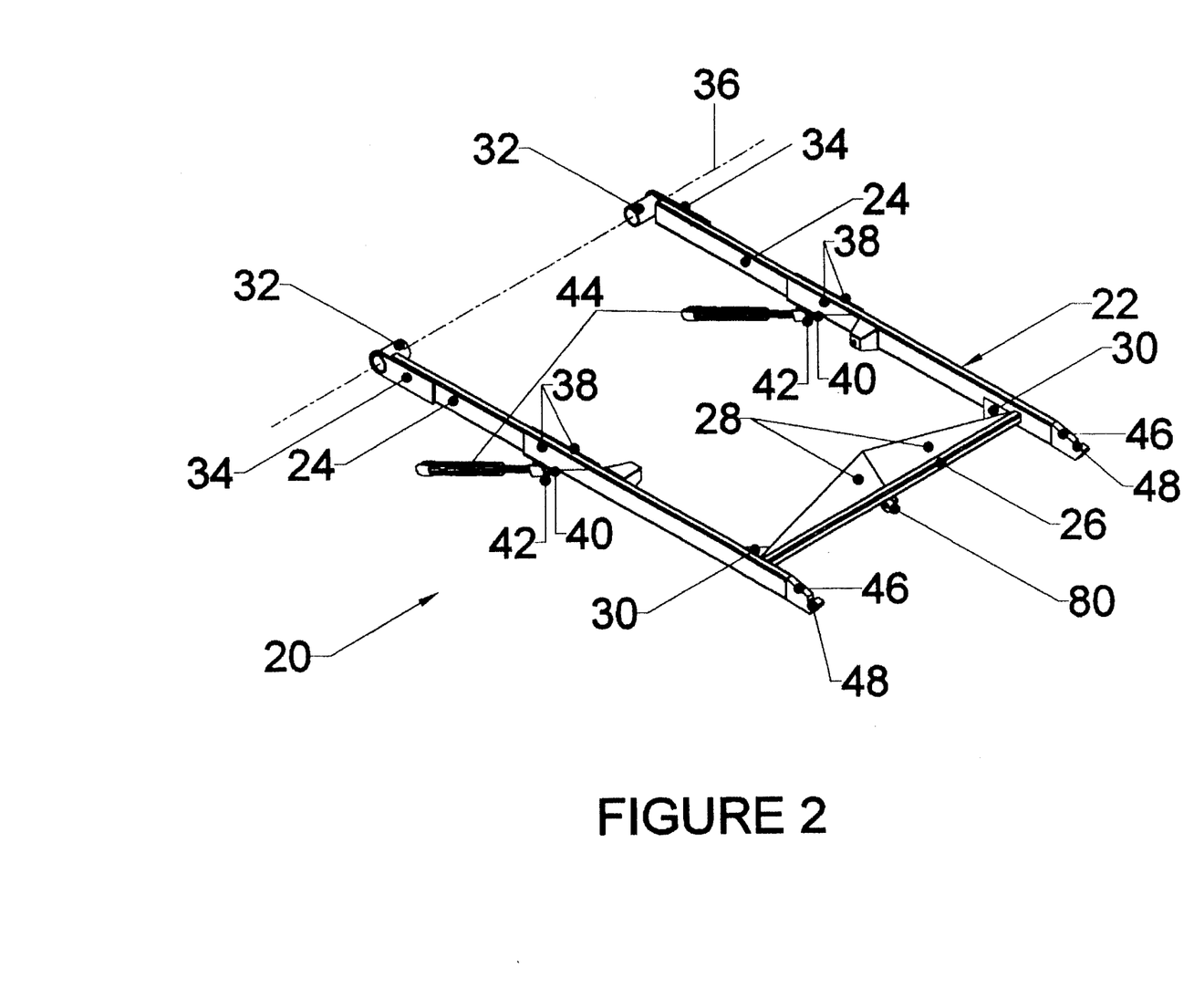
FIG. 2 is an isometric view of the boom of the shredding apparatus.

The boom is most clearly illustrated in FIG. 2. As shown in that drawing, the boom includes a frame 22 consisting of two parallel boom arms 24 and a cross member 26 near the front end of the boom. The cross member is reinforced with two triangular stiffening plates 28 and the ends of the cross member are connected to the boom arms 24 by gusset plates 30.

Two pivot pins 32 are mounted on the inner ends of the boom arms 24 by brackets 34. The pins are aligned on a boom axis 36. Two reinforcing plates 38 are mounted partway along each boom arm and carry a lug 40 on the bottom of the arm. The lug is pinned to a clevis 42 on the end of the rod of an hydraulic cylinder 44. The outer ends of the boom arms are equipped with hanger supports 46, each with an upwardly facing notch 48. These notches engage hanger pins 50 (FIG. 3) which are aligned on a lateral axis 52 parallel to the boom axis 34. The hanger pins 50 support the hanger 16 on the end of the boom.

Figure 3:
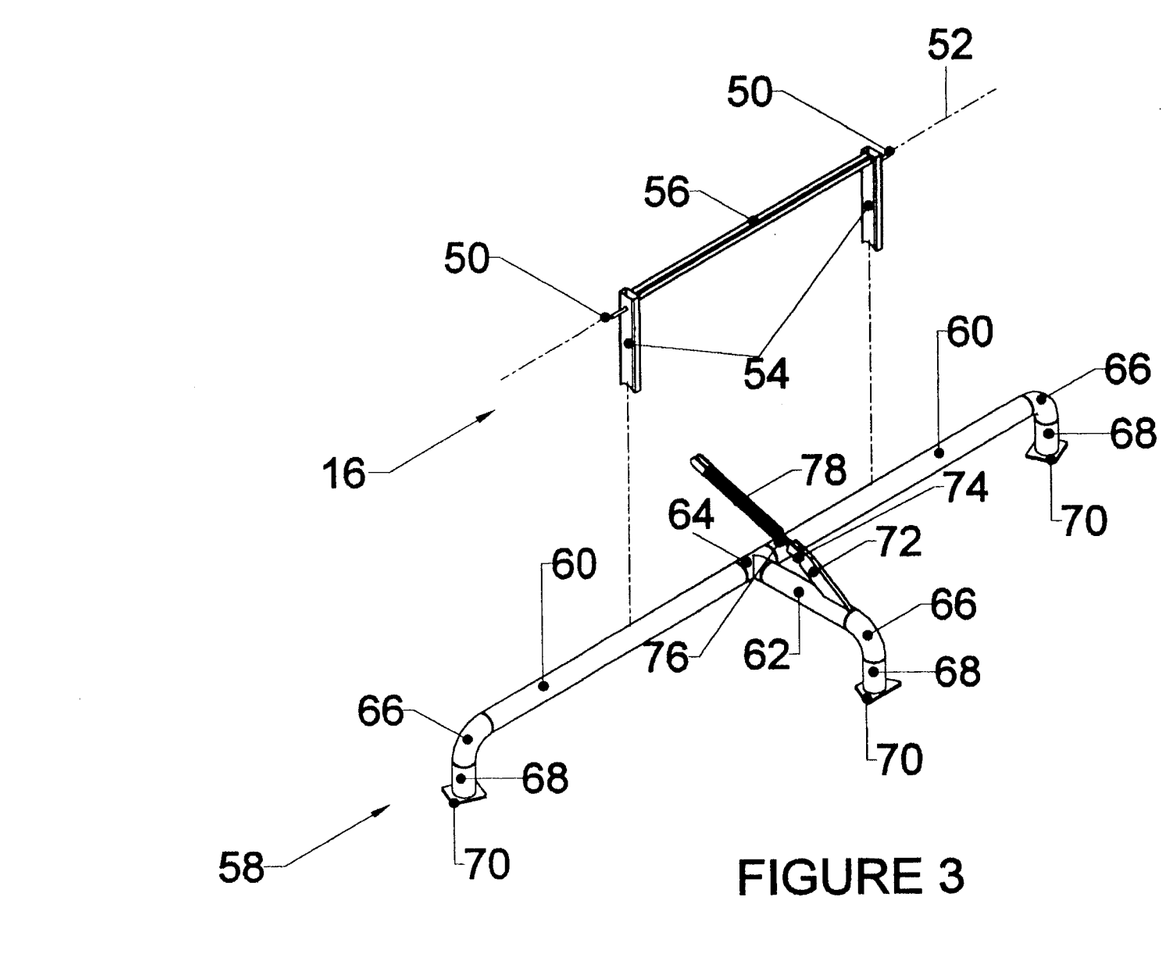
FIG. 3 is an isometric view of the hanger and rotor assembly frame of the apparatus.

The hanger includes a pair of hanger arms 54 joined at the top by a cross member 56. At their bottom ends, the arms 54 are connected to a rotor assembly frame 58 that includes two lateral arms 60 aligned end to end and a center arm 62 projecting to the front. These are all connected at the center of the frame by a Tee fitting 64. The other ends of the lateral arms and the center arm are each connected to an elbow 66 which is in turn connected by a short vertical arm 68 to a mounting plate 70.

A lug 72 is connected to the top of the center arm 62 and is pivotally connected to the clevis 74 on the rod 76 of an hydraulic cylinder 78. The opposite end of the cylinder is pinned to a lug 80 on the cross arm 26 of the boom frame.

Figure 4:
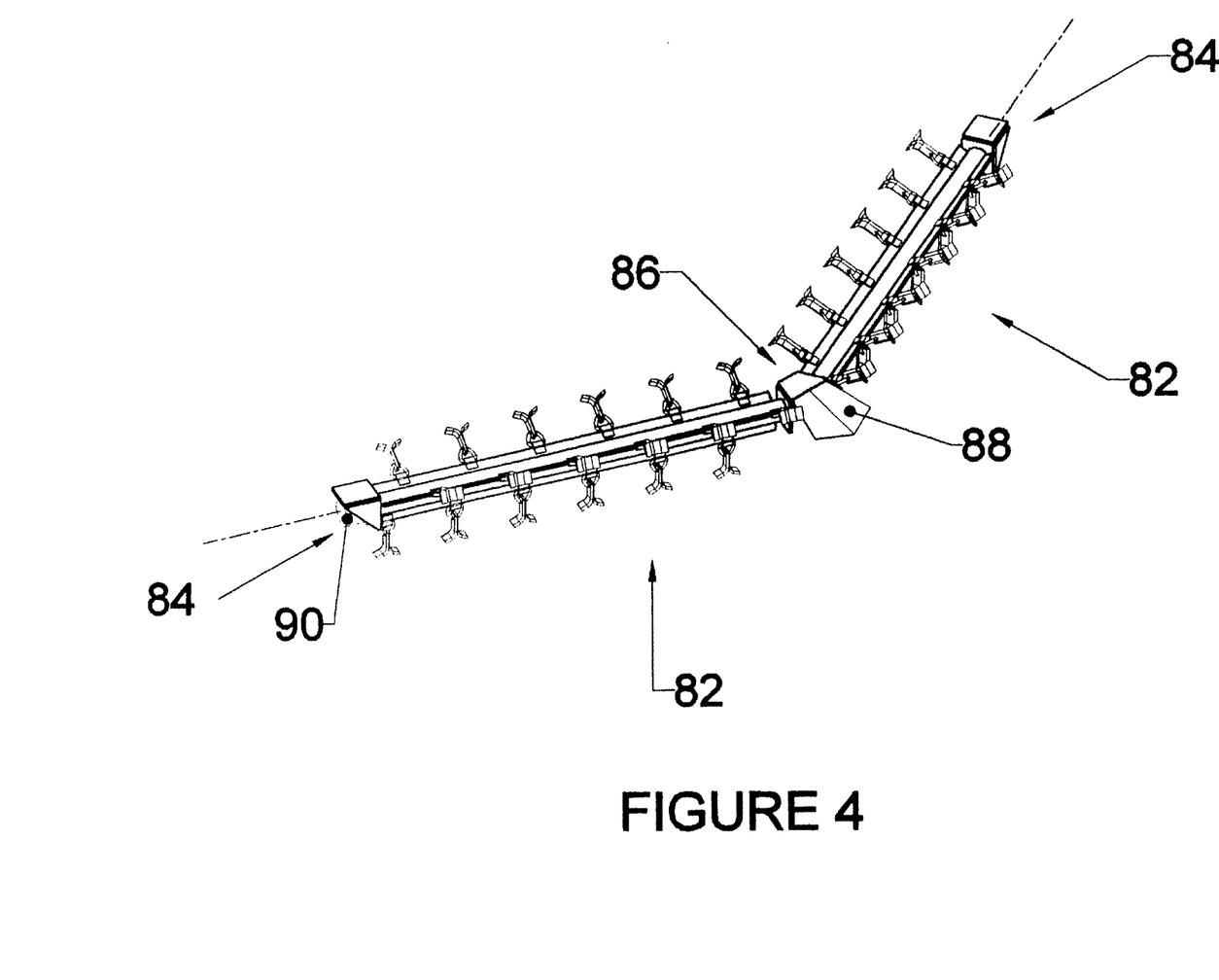
FIG. 4 is an isometric view of the rotor assembly of the apparatus.

The rotor assembly frame 58 carries a rending means in the form of two rotors 82 for chopping or shredding the vegetation. These are arranged in a shallow, obtuse angled V configuration with the point of the V directed forwards. Each of the rotors is rotatably mounted on a bracket 84 at the outer end and on a common center bracket 86 at the center of the rotor assembly. The center bracket 86 carries a deflector plate 88 that slopes downwardly to the front and has a forwardly convex configuration to deflect vegetation to opposite sides of the center bracket, for engagement with the rotors.

Each of the end brackets 84 carries a reversible hydraulic motor 90 with its output connected to the associated rotor 82 for rotating the rotor.

Figure 5:
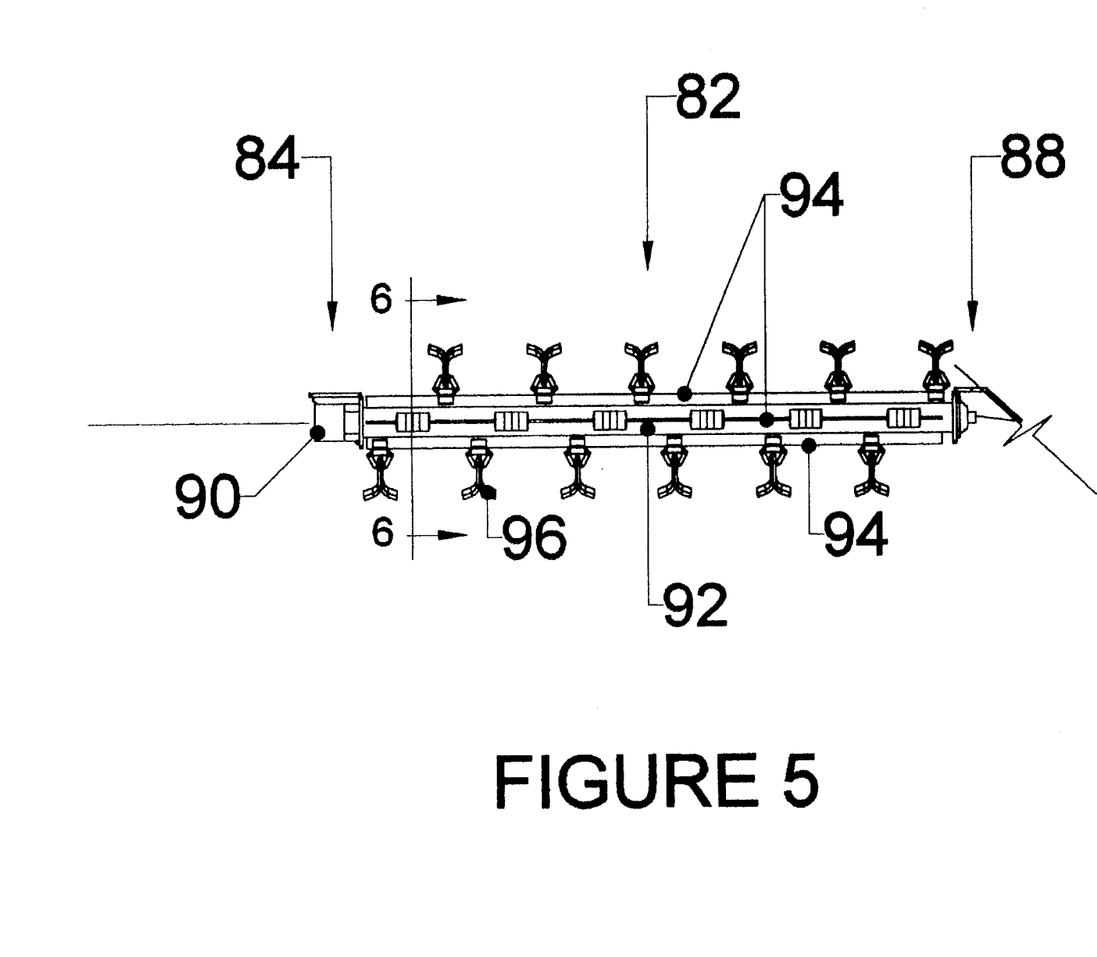
FIG. 5 is a rear view of one rotor assembly of the apparatus, projected perpendicular to the rotor.
Figure 6:
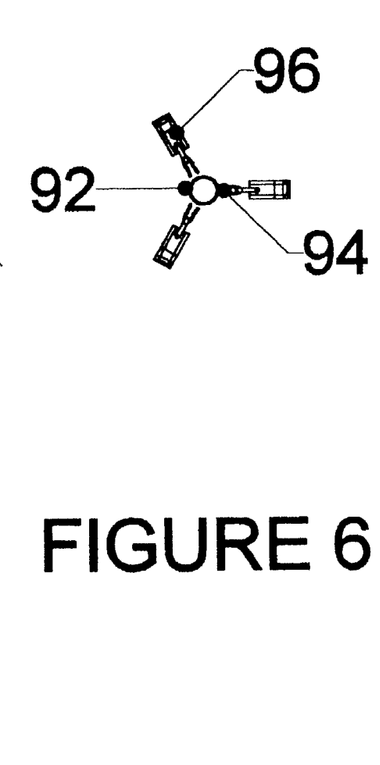
FIG. 6 is a section through a rotor assembly along line 6—6 of FIG. 5.
Figure 10:
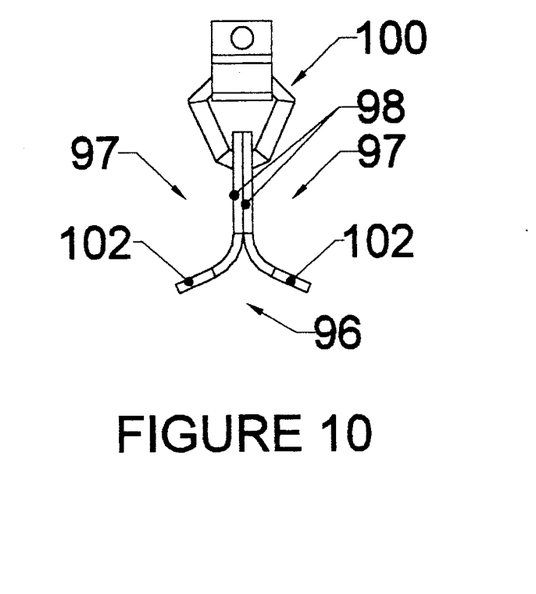
FIG. 10 is a side view of a pair of shredding knives.

The rotor construction is illustrated most particularly in FIGS. 5, 6 and 10. The rotor includes a cylindrical drum 92. Three knife mounting bars 94 are fixed to the drum at positions spaced equally around the periphery of the drum. These bars extend from end to end of the drum, with each carrying a set of knives 96. The knives of the three sets are offset around the rotor as shown most particularly in FIG. 5. The knife configuration is illustrated most particularly in FIG. 10. Each knife is composed of two symmetrical, side by side blades 97. Each blade has a radial section 98 secured to a bracket 100 that bolts directly to the mounting bar. At their outer ends, the two blades have sections 102 that diverge towards opposite ends of the rotor.

Figure 7:
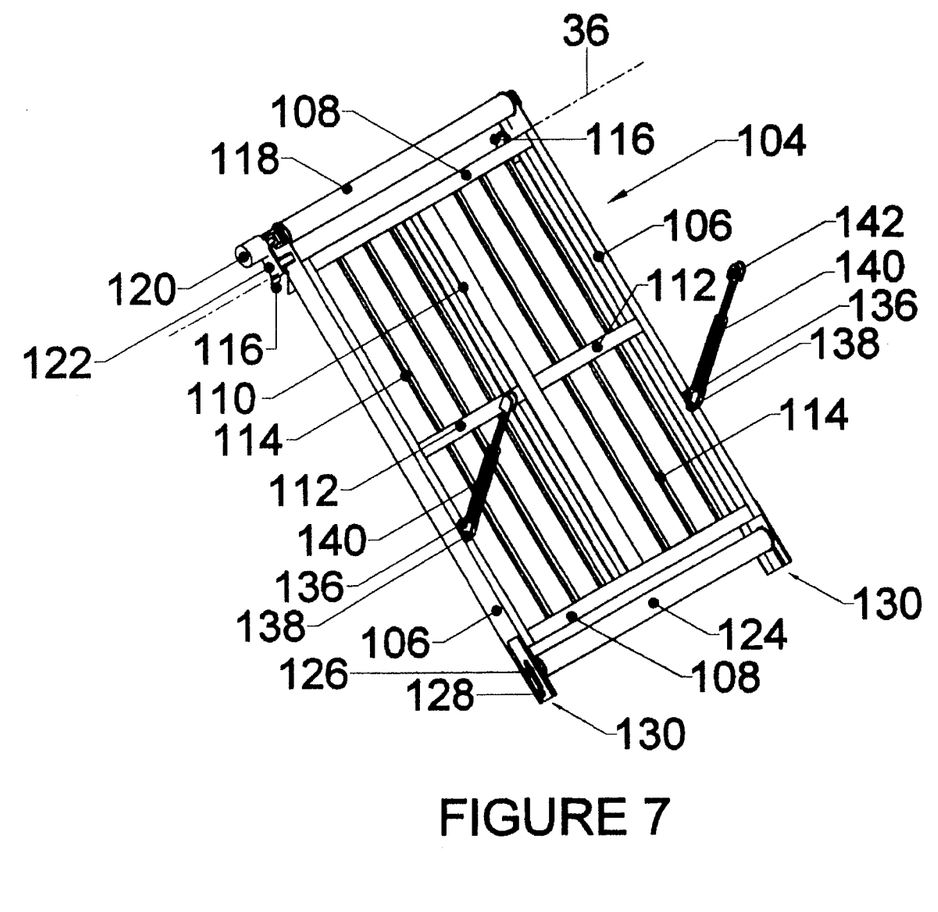
FIG. 7 is an isometric view of the inclined conveyor of the apparatus.

The construction of the conveyor 20 is illustrated most particularly in FIG. 7. The conveyor has a rectangular frame 104 including two side rails 106 joined by cross members 108 adjacent the ends of the side rails. A center rail 110 joins the cross members 108 while lateral cross members 112 extend between the center rail and the respective side rails. The spaces between the center rail and the side rails accommodate belt support bars 114.

At the upper end of each of the side rails 106 is a bracket 116 connected to the adjacent pivot pin 32 of the boom so that the conveyor will rotate about the boom axis 34. Across the upper end of the conveyor frame is a roller 118 supported in bearings on the side rails and driven by an hydraulic motor 120 that is mounted on one of the side rails by a motor bracket 122.

A roller 124 at the lower end of the conveyor has stub shafts 126 at each end. The shafts extend through slots 128 in roll support plates 130 mounted on the side rails. Belt tighteners (not illustrated) adjust the position of the lower roll on the frame to tighten a conveyor belt 134 (FIG. 1) carried on the frame and driven by the upper roller. Each of the side rails 106 is equipped with a lug 136 that is pinned to a clevis 138 on the cylinder end of an hydraulic cylinder 140. The rod end of the cylinder has a clevis 142 that is pinned to a lug 144 on one of the boom frame arms 24 (FIG. 1).

Figure 8:
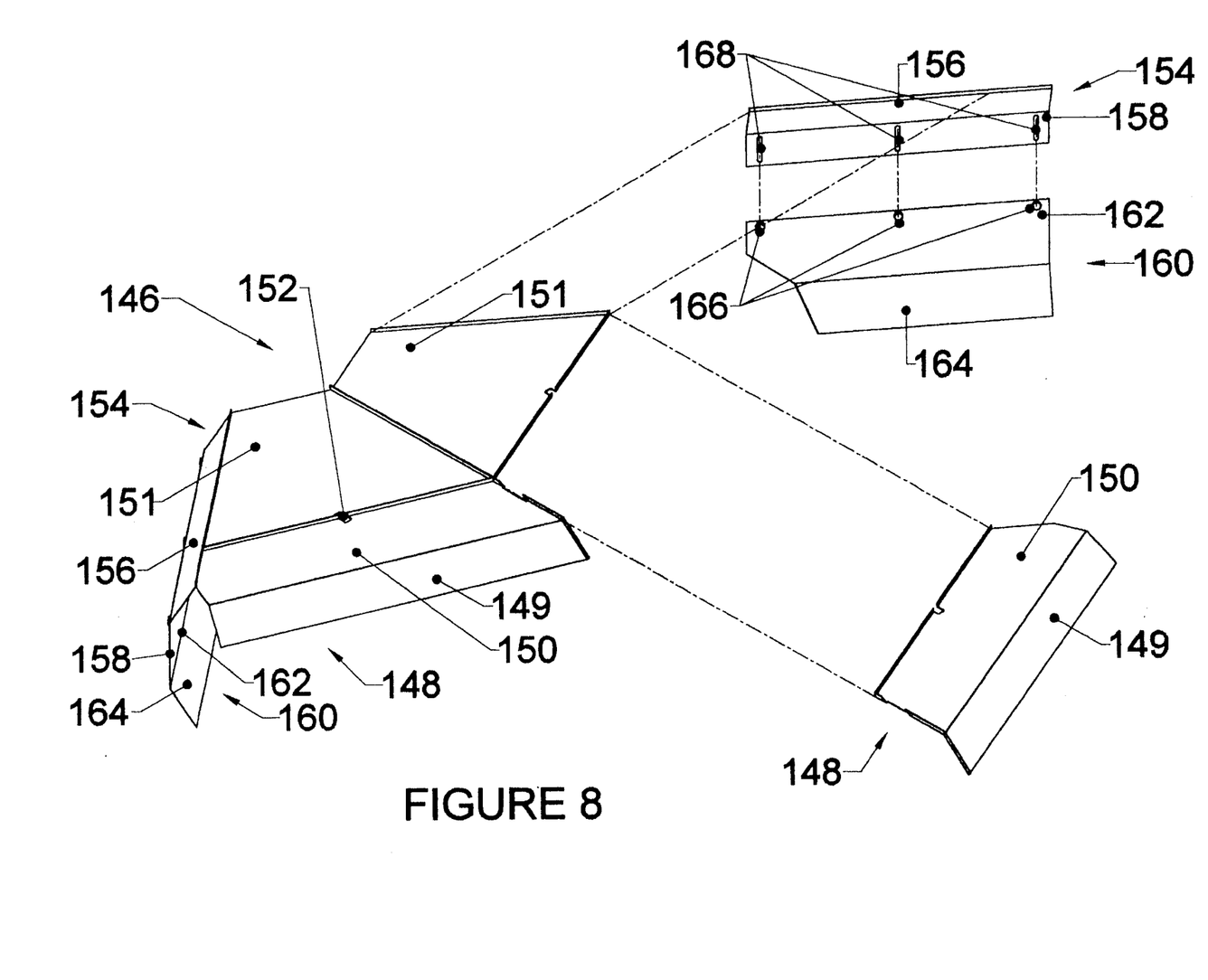
FIG. 8 is an isometric view of the deflector shield of the apparatus.

The rotor assembly is enclosed on the top and ends with a deflector or shroud 146 that is illustrated most particularly in FIG. 8. The shroud is a multi-panel assembly that is symmetrical about the center line of the apparatus. On each side it includes a nose panel 148 with a front section 149 that slopes down and to the front, over the adjacent rotor. The back section 150 of the nose panel extends over the top of the rotor to the front of a trapezoidal top panel 151. At the junction between the nose panel and the top panel is a notch 152 to accommodate one of the hanger arms 54. The center edge of the nose panel is also notched to accommodate the lug 72 on the rotor assembly frame. At each side of the shroud is a side panel 154. This includes an upper section 156 that slopes downwardly to the outside and a vertical lower section 158. A side extension 160 extends along the bottom of each side panel 154. It has an upper section 162 that connects to the lower section of the side panel and a lower section 164 that slopes downwardly and inwardly. The coupling between the upper section 162 of the side extension and the lower section 158 of the side panel is by means of bolts through holes 166 in the side extension section 162 and vertical slots 168 in the lower section of the side panel. This provides for vertical adjustment of the side extension.

Figure 9:
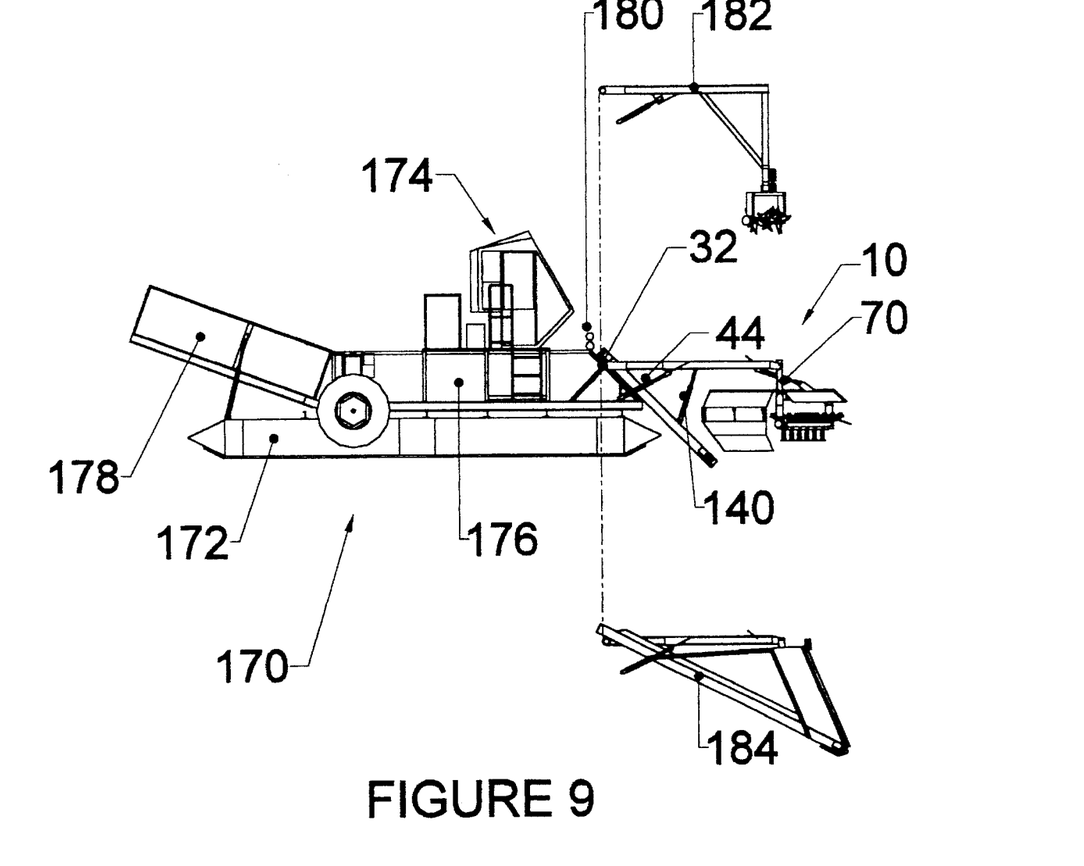
FIG. 9 is a side view of a harvester with the shredder apparatus attached.

The shredding and harvesting apparatus described is intended to be mounted on a floating platform such as the vessel 170 illustrated in FIG. 9. This vessel has two pontoons 172 (one shown) for floatation. A superstructure 174 includes an operator's station with a seat and the appropriate controls. At the center of the vessel is a conveyor bottomed container 176. Immediately behind the container is an unloading conveyor 178. The shredding and harvesting apparatus is mounted on the vessel using the boom mounting pins 32 and the hydraulic cylinders 44. The cylinders are lift cylinders for the boom and for the shredding and harvesting apparatus as a whole. They control movement of the apparatus around the boom axis 34. The cylinders 140 raise and lower the outboard end of the conveyor 20. This allows the operator to adjust the depth of the outboard end of the conveyor in the water, as well as to raise the conveyor completely out of the water for travel while the apparatus is not in operation. The cylinder 70 is used to control pitch movements of the rotor assembly about the axis 52.

The vessel may be equipped with dewatering rolls 180 immediately behind the conveyor 20. These are counter-rotating rollers that receive material from the conveyor 20 in their nip and press water out of the vegetation before it is delivered to the container 176.

As illustrated in FIG. 9, the shredding and harvesting apparatus is readily replaced with a derooting head 182 or a harvesting head 184.

Figure 11:
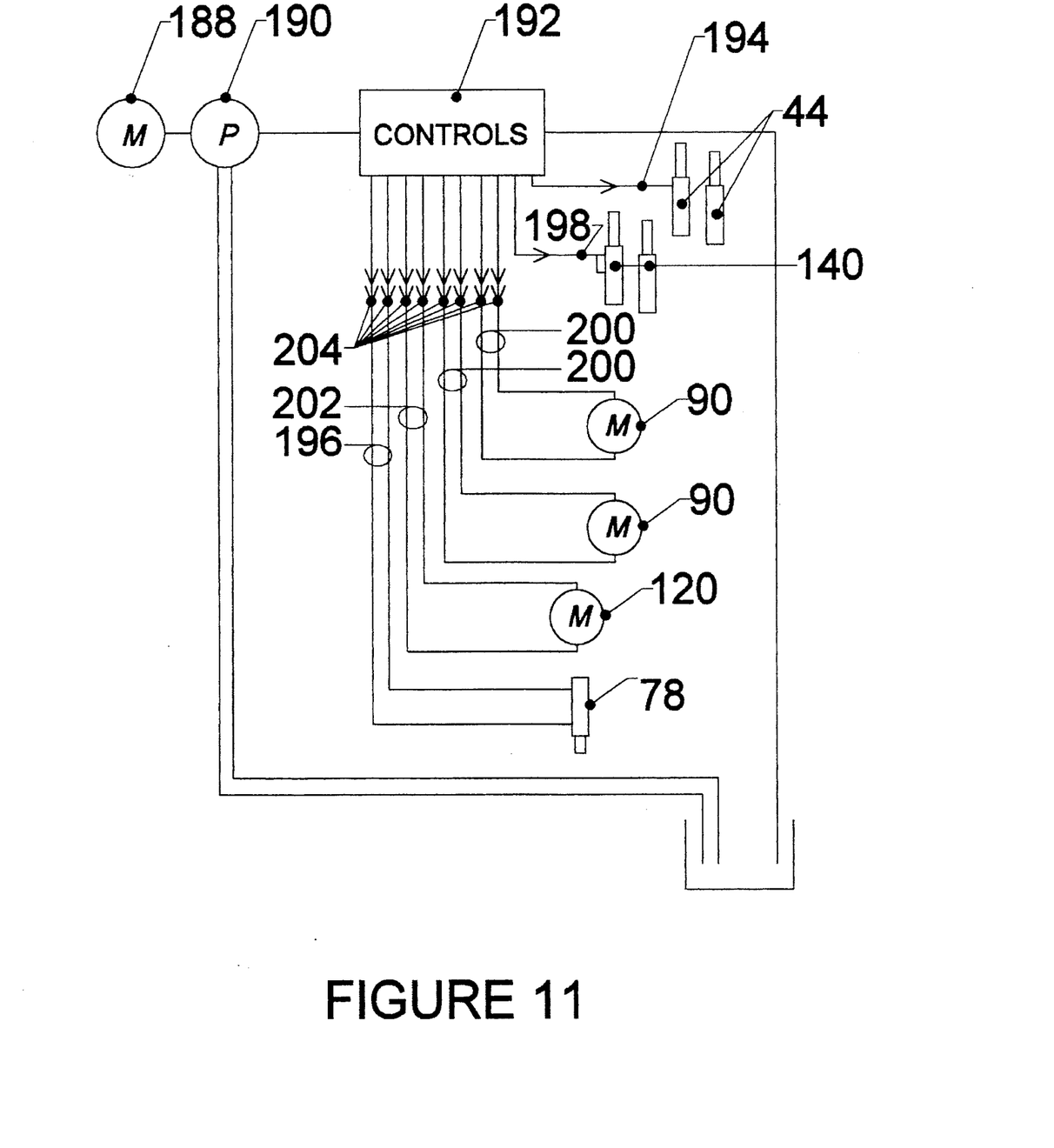
FIG. 11 is a hydraulic schematic.

The hydraulic controls for the apparatus are illustrated in FIG. 11. The system 186 includes a motor 188 driving an hydraulic pump 190. The output from the pump is delivered through a set of controls 192 to a set of lines for controlling the various functions of the apparatus. These include line 194 to the boom lift cylinders 44, lines 196 to the rotor assembly pitch cylinder 78 and line 198 to the conveyor lift cylinders 140. The rotor drive motors are reversible motors that are driven independently through independent lines 200. The conveyor drive motor 120 is another reversible motor that is driven independently by the controls through lines 202. All of the hydraulic lines are equipped with quick release fittings 204 to enable the shredding head and its replacements to be disconnected when desired.

In use of the apparatus, the boom lift cylinders accommodate height adjustments of the rotor and its relationship to the water level at all times. When the rotors are lowered to the water's surface and actuated, the knives sweep through the vegetation in their path. The pitch of the rotor assembly is controlled by the operator to vary the pitch angle, the degree of engagement with the vegetation on the water's surface as well as the width of the swath cut by the apparatus. As the vessel advances, the shredded vegetation is formed into a windrow by the rotors and the deflecting shroud for collection by the inclined conveyor. The slope of the conveyor is adjusted by the operator to accommodate the depth of the vegetation stand.

While one embodiment of the present invention has been described in the foregoing, it is to be understood that other embodiments are possible within the scope of the invention. For example, the angle of convergence of the two rotors may vary widely. It may, for example, be between 120° and 180°, the latter being aligned rotors with no convergence. The converging rotors arrangement is preferred because it provides improved tracking and allows each knife to treat a wider swath of vegetation. The knives described have proven to work well, but other arrangements may be suitable, provided the function of rending the vegetation into smaller parts is adequately carried out.

The present invention is therefore to be considered limited solely by the scope of the appended claims.

We claim:

1. A method for harvesting floating aquatic vegetation at the surface of a body of water, said method comprising:

rending the vegetation when floating in situ on the body of water; and removing the rent vegetation from the surface of the body of water.

2. A method according to claim 1 comprising rending the vegetation by providing chopping means adjacent the surface of the body of water and advancing the chopping means through the vegetation.

3. A method according to claim 1 comprising removing the rent vegetation by forming the rent vegetation into a floating windrow and elevating the windrow from the surface of the body of water.

4. A method according to claim 3 comprising delivering the elevated windrow to a collection container.

5. A method according to claim 4 comprising dewatering the rent vegetation after elevating it from the surface of the body of water and before delivering it to the collection container.

6. A method according to claim 1 comprising dewatering the rent vegetation.

7. Apparatus for harvesting floating aquatic vegetation at the surface of a body of water, said apparatus comprising:

a platform floating on the body of water;

means for advancing the platform in a forward direction across the body of water;

vegetation rending means mounted on the platform and positioned at least partially in the body of water adjacent the surface thereof for rending the vegetation as the platform advances thereacross; and vegetation removing means mounted on the platform for removing the rent vegetation from the surface of the body of water.

8. Apparatus according to claim 7 wherein the vegetation rending means comprise two rotors arranged end to end across a front side of the platform, the rotors being arranged with respect to one another in an obtuse angle V-shape with a point directed away from the front of the platform;

vegetation chopping means on the rotors; and means for rotating the rotors.

9. Apparatus according to claim 8 wherein the means for rotating the rotors comprise means for rotating the rotors in such a direction that top sides of the rotors travel forwardly away from the front of the platform.

10. Apparatus according to claim 9 including shroud means enclosing the top and ends of the rotors for containing rent vegetation thrown off by the rotors.

11. Apparatus according to claim 10 wherein the shroud means converge from the ends of the rotor rearwardly towards the platform for forming the rent vegetation into a floating windrow.

12. Apparatus according to claim 11 wherein the vegetation removing means comprise a conveyor rearwardly of the shroud means for elevating the floating windrow.

13. Apparatus according to claim 12 including container means on the platform for receiving vegetation from the conveyor.

14. Apparatus according to claim 12 including dewatering means for dewatering the vegetation elevated by the conveyor.

15. Apparatus according to claim 14 wherein the dewatering means comprise pressing rollers having a nip therebetween, and means for passing the vegetation through the nip.

16. A harvesting head for mounting on a self-propelled, floating platform for harvesting floating aquatic vegetation from the surface of a body of water, said head comprising:

a boom;

boom mounting means for mounting the boom on the platform for pivoting movement about a substantially horizontal boom axis;

boom elevating means for controllably pivoting the boom about the boom axis;

a vegetation rending head comprising;
two elongate rotors arranged end to end in an obtuse angle V-shape;
vegetation chopping means mounted on each rotor; and
means for rotating the rotors;

hanger means for pivotally mounting the vegetation rending head on the boom for movement about a head axis substantially parallel to the boom axis; and head pitch control means connected between the boom and the vegetation rending head for controllably pivoting the head about the head axis.

* * * * *